United States Patent
Li et al.

(10) Patent No.: US 8,024,342 B2
(45) Date of Patent: Sep. 20, 2011

(54) SYSTEMS AND METHODS FOR DETERMINING A TAG MATCH RATIO

(75) Inventors: Xin Li, Sunnyvale, CA (US); Lei Guo, San Jose, CA (US); Eric Zhao, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 505 days.

(21) Appl. No.: 12/183,217

(22) Filed: Jul. 31, 2008

(65) Prior Publication Data
US 2010/0030766 A1    Feb. 4, 2010

(51) Int. Cl.
*G06F 7/00* (2006.01)
(52) U.S. Cl. .................................. 707/736; 707/750
(58) Field of Classification Search .................. 707/705, 707/706, 709, 722, 748, 750, 758, 736; 709/246
See application file for complete search history.

(56) References Cited

U.S. PATENT DOCUMENTS

| | | | |
|---|---|---|---|
| 2006/0259475 A1* | 11/2006 | Dehlinger | 707/3 |
| 2007/0033221 A1* | 2/2007 | Copperman et al. | 707/103 R |
| 2007/0185858 A1* | 8/2007 | Lu et al. | 707/5 |
| 2008/0071929 A1* | 3/2008 | Motte et al. | 709/246 |

* cited by examiner

*Primary Examiner* — Hung T Vy
(74) *Attorney, Agent, or Firm* — Seth H. Ostrow; Ostrow Kaufman LLP

(57) ABSTRACT

The present invention is directed towards systems and methods for determining a tag match ratio. The method according to one embodiment of the present invention comprises selecting a content item, identifying one or more tags that are associated with the content item and determining a weight for each of the one or more tags associated with the content item. The method further comprises extracting one or more keywords from the content item. A tag match ratio for the one or more tags associated with the content item is then calculated and stored.

18 Claims, 4 Drawing Sheets

US 8,024,342 B2

SYSTEMS AND METHODS FOR DETERMINING A TAG MATCH RATIO

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF INVENTION

Embodiments of the invention disclosed herein relate generally to determining the quality of tags associated with a web document. More specifically, embodiments of the present invention are directed towards systems, methods and computer program products for determining the quality of tags associated with a web document in reflecting the content of the web document by determining a tag match ratio.

BACKGROUND OF THE INVENTION

A tag may be thought of as a keyword or term associated with or assigned to a content item, such as a webpage, a digital image, a video clip, an internet bookmark, etc., which serves to describe the content item and enable classification of the content item. Tags are typically chosen informally and personally by end users who use a content item and assign one or more tags to the content item, which may be accomplished through the bookmarking process. As the digital environment continues to expand, the number of users of content items is increasing dramatically. Inherent in the increase of the number of users who view and interact with content items is an increase in the number of tags associated with a given content item that are personal to a user and may not accurately reflect the content of the of the content item. In essence, as more users tag a content item, the larger the spectrum of the subject of the tags, and thus, the greater the likelihood that the tags associated with the content item do not accurately reflect the content contained therein.

Thus, there is a need in the art for systems, methods and computer program products that allow for the determination of the quality of tags associated with a web document in reflecting the content of the web document.

SUMMARY OF THE INVENTION

The present invention is directed towards systems, methods and computer program products for determining a tag match ratio. The method of the present invention comprises selecting a content item and identifying one or more tags that are associated with the content item. A weight for the one or more tags associated with the content item is determined and one or more keywords are extracted from the content item. A tag match ratio for the one or more tags associated with the content item is then calculated and stored in association with the content item.

The system of the present invention comprises one or more client devices coupled to a network, a content server coupled to the network operative to transmit and receive data from the client devices and a search engine operative to select a content item. The system further comprises a tagging module operative to identify one or more tags that are associated with the content item and determine a weight for the one or more tags associated with the content item. The system also comprises a keyword extractor operative to extract one or more keywords from the content item, a ratio engine operative to calculate a tag match ratio for the one or more tags associated with the content item and a data store operative to store the tag match ratio for the one or more tags associated with the content item.

The computer readable media of the present invention comprises program code for execution by a programmable processor that instructs the processor to perform a method for determining a tag match ratio. The computer readable media comprises program code for selecting a content item, program code for identifying one or more tags that are associated with the content item and program code for determining a weight for the one or more tags associated with the content item. The computer readable media further comprises program code for extracting one or more keywords from the content item. The computer readable media also comprises program code for calculating a tag match ratio for the one or more tags associated with the content item and program code for storing the tag match ratio for the one or more tags associated with the content item.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE EMBODIMENTS

In the following description, reference is made to the accompanying drawings that form a part hereof, and in which is shown by way of illustration specific embodiments in which the invention may be practiced. It is to be understood that other embodiments may be utilized and structural changes may be made without departing from the scope of the present invention.

Figure 1:
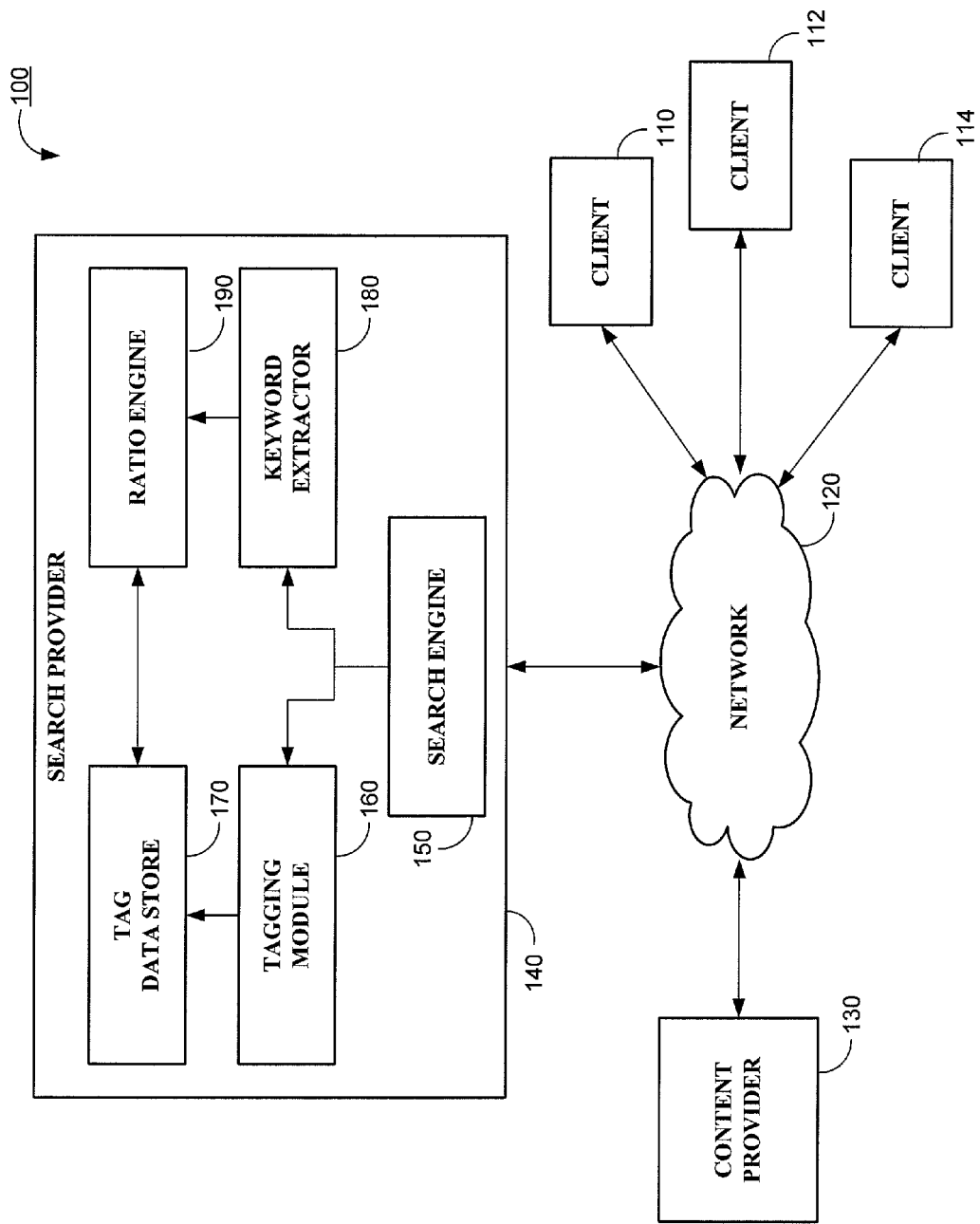
FIG. 1 presents a block diagram depicting a system for determining a tag match ratio according to one embodiment of the present invention.

FIG. 1 illustrates one embodiment of a system for determining a tag match ratio 100 that includes a first client 110, a second client 112, a third client device 114, a computer network 120, one or more content providers 130, and a search provider 140. The search provider 140 comprises a search engine 150, a tagging module 160, a tag data store 170, a keyword extractor 180 and ratio engine 190.

The computer network 120 may be any type of computerized network capable of transferring data, such as the Internet. According to one embodiment of the invention, the first client device 110, the second client device 112 and the third client device 114 are general purpose personal computers comprising of a processor, transient and persistent storage devices, input/output subsystem and bus to provide a communications path between components comprising the general purpose personal computer. For example, a 3.5 GHz Pentium 4 personal computer with 512 MB of RAM, 40 GB of hard drive storage space and an Ethernet interface to a network. Other client devices are considered to fall within the scope of the present invention including, but not limited to, hand held devices, set top terminals, mobile handsets, PDAs, etc. The present invention is not limited to only three client devices 110, 112 and 114 and may comprise additional, disparate client devices. The client devices 110, 112 and 114 are therefore presented for illustrative purposes representative of multiple client devices.

According to one embodiment of the invention, the content provider 130 and the search provider 140 maintain severs that are programmable processor-based computer devices that include persistent and transient memory, as well as one or more network connection ports and associated hardware for transmitting and receiving data on the network 120. The content provider 130 and the search provider 140 may host websites, store data, serve ads, etc. Those of skill in the art understand that any number and type of content provider 130, search provider 140 and client devices 110, 112 and 114 may be connected to the network 120.

The search engine 150, the tagging module 160, the keyword extractor 180 and the ratio engine 190 may comprise one or more processing elements operative to perform processing operations in response to executable instructions, collectively as a single element or as various processing modules, which may be physically or logically disparate elements embodied in various combinations of hardware and software structures. The tag data store 170 may comprise one or more data storage devices of any suitable type, operative to store corresponding data therein. Those of skill in the art recognize that the search provider 140 may utilize more or fewer components and data stores, which may be local or remote with regard to a given component or data store.

In accordance with one embodiment, the first client device 110, the second client device 112, the third client device 114, the search provider 140 and the content provider 130 are communicatively coupled to the computer network 120. The first client device 110 or the second client device 112 may communicate across the network 120 with the search provider 140 and may transmit one or more search queries which may comprise one or more terms. The search engine 150 of the search provider 140 receives a given search query and utilizes the search terms of the given query to identify a result set of one or more content items that fall within the scope of the search query. The search engine 150 may search for content items that are made available on the network 120 by the one or more content providers 130. The search engine 150 utilizes the data associated with the content items that are responsive to the given query to generate a result set.

In accordance with one embodiment, the search engine 150 transmits the result set for a given search query over the network to the given client 110, 112 and 114 from which the search engine 150 receives the given query. A user of a given client 110, 112 or 114 may select a given content item in the result set, in response to which a given content provider 130 that maintains the given content item transmits the content item to the search provider 140 over the network 120, which is directed to the requesting client device. The user of the requesting client device 110, 112 or 114 may view the content item and may also elect to tag the content item with one or more tags.

The tagging module 160 of the search provider 140 provides to the capability of adding one or more tags to a content item. The tagging module 160 may receive the one or more tags with which the user of the client device 110, 112 or 114 tags the given content item for storage in association with the content item in the tag data store 170. According to one embodiment, the tag data store 170 maintains an index of content items and the one or more tags associated with a given content item. For example, the given content item may be a web document, with the index containing an entry for the web document and the one or more tags with which the user tagged the web document.

When multiple users of disparate client devices 110, 112 and 114 view the same content item and both users tag the content item with one or more tags, the tagging module 160 may also record the frequency of each tag that is used to tag the content item in the index of the tag data store 170. For example, for a given content item that is a web document, the user of the first client device 110 and the user of the second client device 112 may both tag the web document with the same tag, so that the index of the tag data store 170 stores that the given content item has the certain tag associated therewith and was used twice by two different viewing users. The tag data store 170 may pass the data to the ratio engine 190 to perform certain calculations in determining a tag match ratio for the one or more tags associated with the given content item.

In accordance with one embodiment, when the given content provider 130 transmits the given content item to the search engine 150 of the search provider 140 to transmit the content item for display to the user of the first client device 110, the search engine may also pass the content item to the keyword extractor 180. The keyword extractor 180 extracts one or more keywords from the given content item. According to one embodiment, keywords are extracted from a given content item by determining words comprising the content of the content item, removing stop-words and normalizing the remaining words, which may be accomplished with a stemming approach. Other methods that are known in the art can be used to extract one or more keywords from a given content item.

The one or more keywords that are extracted from the given content item may be passed to the ratio engine 190 to be used in conjunction with the data received from the tag data store 170 to determine a tag match ratio for the one or more tags associated with the given content item. Methods for determining the tag match ratio are discussed in relation to the description of FIGS. 2 and 3. The ratio engine 190, upon determining the tag match ratio for the given content item may pass the data to the tag data store 170 for storage in an index. For example, the index of the tag data store may have multiple entries where in a given entry is a content item along with the associated tags, the frequency of each of the associated tags and a tag match ratio value for the set of tags associated with the content item.

In accordance with one embodiment, a user of a given client device 110, 112 or 114 may submit one or more search queries comprising one or more search terms. As discussed previously, the search engine 150 receives a given search query and utilizes the search terms of the given query to identify a result set comprising one or more content items that fall within the scope of the search query. The search engine 150 searches for content items that are made available on the network 120 by the one or more content providers 130. The search engine 150 utilizes the data associated with the content items that are responsive to the given query and generates a result set. The search engine 150 may also search the tag data store 170 and retrieve tag match ratios for one or more of the content items in the result set, which may be displayed to the user along with the result set.

Figure 2:
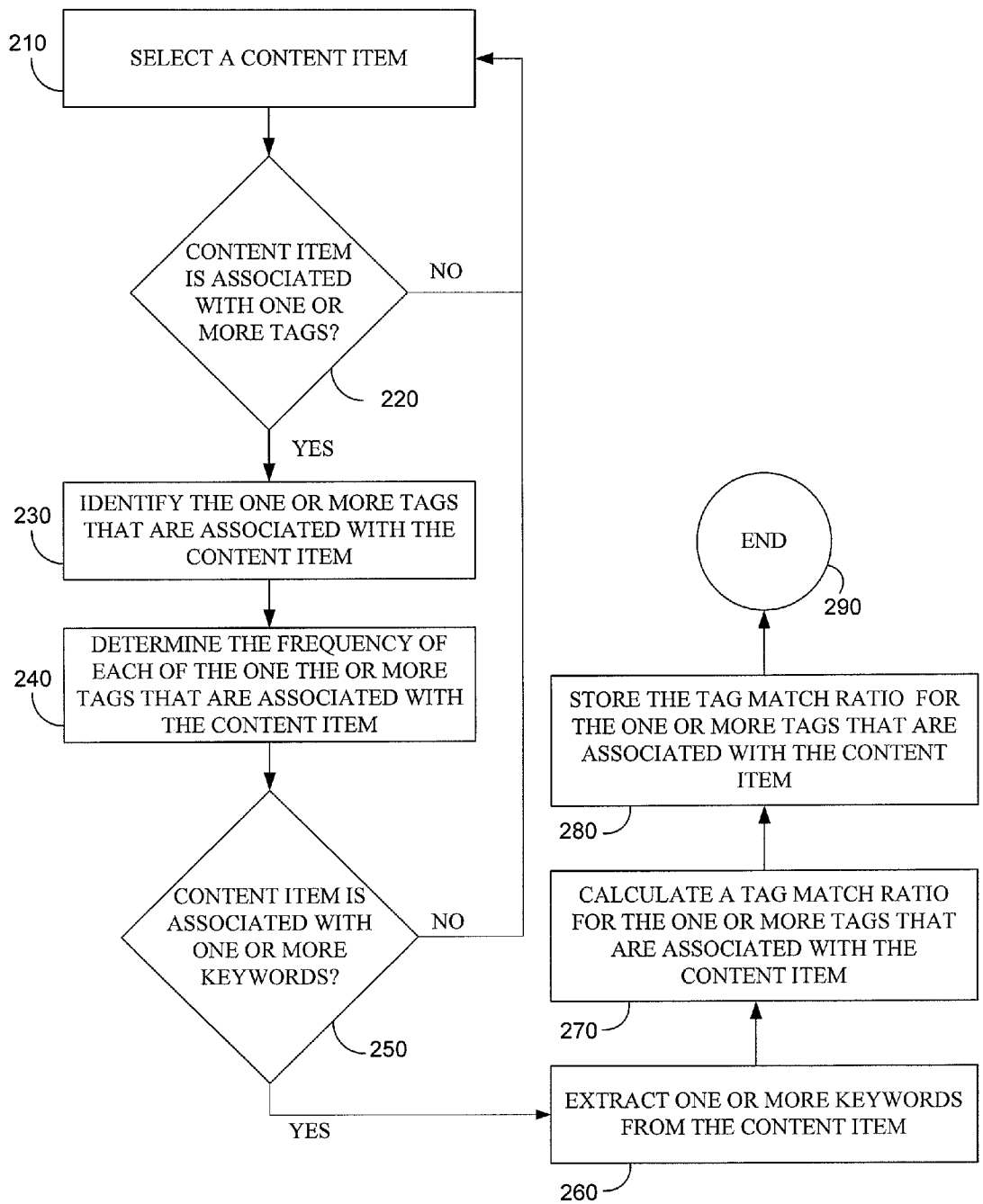
FIG. 2 presents a flow diagram illustrating a method for determining a tag match ratio according to one embodiment of the present invention.

FIG. 2 presents a flow diagram illustrating a method for determining a tag match ratio according to one embodiment of the present invention. In accordance with the embodiment of FIG. 2, the method may begin with the selection of a content item, step 210. In one embodiment, selecting a content item may comprise selecting a website domain by providing a URL, for example, www.example.com. In another embodiment, selecting a content item may comprise selecting a web document from a result set generated by a search engine in response to a search query. A determination may be made as to whether the selected content item is associated with one or more tags, step 220. For example, a content item, such as the web page located at the URL www.yankees.com, may be tagged with the following exemplary tags: "sports," "baseball," "team," "New York," "champions." If the content item is associated with one or more tags, the one or more tags that are associated with the content item are identified, step 230. Continuing from the previous example, a search engine identifies that the tags "sports," "baseball," "team," "New York" and "champions," are associated with the web page located at the URL, www.yankees.com. If the content item is not associated with any tags, e.g., users have not tagged the content item, program flow will revert back to step 210 in order to select a different content item.

At step 240, the frequency of the one or more tags that are associated with the content item is determined. Continuing from the previous example, a tagging module may determine the number of times the tags "sports," "baseball," "team," "New York" and "champions," were used to tag the web page located at the URL www.yankees.com. If for example, seven users tagged the web page with the tag "sports" and five users tagged the website with the tag "baseball", the frequency of the tag "sports" would be seven, while the frequency for the tag "baseball" would be five.

A determination may be made as to whether the selected content item is associated with one or more keywords, step 250. Continuing from the previous example, a search provider such as Yahoo!® or the content provider of the web page may attach the keywords "sports" and "baseball" to the web page located at the URL, www.yankees.com. If the content item is not associated with any keywords, program flow will revert back to step 210 in order to select a different content item. If the web document is associated with one or more keywords, the one or more keywords are extracted from the content item, step 260. For example, a keyword extractor may extract the keywords "sports" and "baseball" that are associated with the web page by the content provider or a search provider.

A tag match ratio may be calculated for the one or more tags that are associated with the content item, step 270. The tag match ratio is calculated on the basis of the frequency of the tags associated with the content item, as well as the keywords associated with the content item. Continuing from the previous example, the ratio engine may use such data to determine a tag match ratio for the set of tags ("sports," "baseball," "team," "New York" and "champions") that are associated with the baseball team web page. A detailed description of the method for calculating the tag match ratio according to one embodiment of the invention is described in greater detail with relation to FIG. 3. The tag match ratio may be stored for the set of tags, step 280, and the method terminates, step 290.

Figure 3:
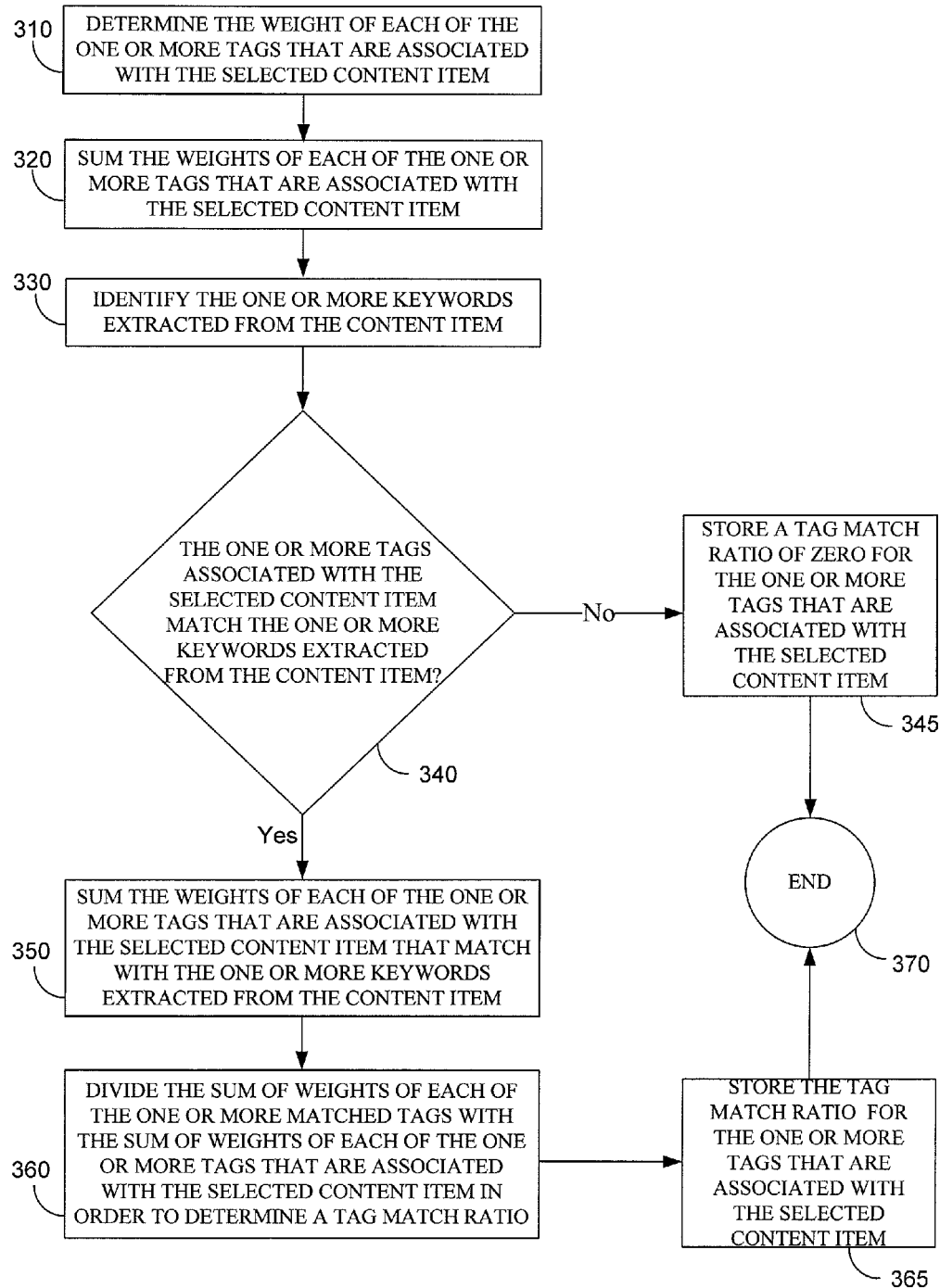
FIG. 3 provides a flow diagram illustrating a method for determining weights of tags associated with a content item to calculate a tag match ratio according to one embodiment of the present invention.

FIG. 3 presents a flow diagram illustrating a method for determining weights of tags associated with a content item in order to calculate a tag match ratio according to one embodiment of the present invention. In accordance with the embodiment of FIG. 3, the method may begin by determining the weight of the one or more tags that are associated with the selected content item, step 310. According to one embodiment, the weight of each tag is the number of times multiple users use a specific tag in tagging content items in a given corpus of content items, which according to one embodiment includes all content items in the given corpus. For example, if seven users tagged the New York Yankees web page with the tag "sports," five users tagged the NY Mets web page with the tag "sports" and one user tagged the SF Giants web page with the tag "sports," the frequency would be thirteen.

The frequency of the tag "sports" across the content items is the sum of the frequency of user tags, step 320, for example, 7+5+1, which equals a frequency of thirteen for the tag "sports." Accordingly, the tag "sports" in the present example has a frequency of 13 when used for calculating a tag match ratio for the three disparate web pages. As discussed above with respect to FIG. 1, this may be performed by the ratio engine 190 at the search provider 140. Therefore, this global frequency shows the overall significance of a tag and, according to the present example, even though only one user tagged the SF Giants web site with the tag "sports," the frequency of the tag when used for calculating a tag match ration is thirteen.

At step 330, the one or more keywords that are extracted from the content item are identified. Continuing from the previous example, the keywords "sports" and "baseball" are extracted from the New York Yankees web page. A determination is then made as to whether the one or more tags associated with the selected content item matches the one or more keywords extracted from the content item, step 340. For example, if the only two tags associated with the New York Yankees web page are "sports" and "baseball", at least one of the tags associated with the web page matches the keywords associated with the web page. If none of the tags associated with the content item match the one or more keywords extracted from the content item, a tag match ratio of zero for the one or more tags associated with the selected content item is stored, step 345, and the method ends at step 370.

If at least one of the tags associated with the selected content item match the one or more keywords extracted from the content item, then the weights of the one or more tags that are associated with the selected content item that also match the one or more keywords extracted from the content item are summed, step 350. Continuing from the previous example, the two tags associated with the New York Yankees web page is "sports" and "baseball," which match the keywords associated with the web page so that the total weight for the matching tags is 12. The sum of the weights of the one or more matching tags is then divided by the sum of the weights of each of the one or more tags associated with the selected content item in order to determine a tag match ratio, step 360. For example, the sum of the weights of the matching tags "sports" and "baseball", which was calculated to be a value of 12, is divided by the sum of the weights of the entire set of tags associated with the New York Yankees web page, which was calculated to be a value of 12, producing a net result of one. Therefore, the tag match ratio for the entire set of tags associated with the New York Yankees web page is one. In an alternative example, if only the tags associated with the web page were "baseball" at a frequency of five and "team" at a frequency of four, the sum of the weights of matching tags would only be five in this instance as "baseball" is the only tag that matches any of the keywords, and the sum of the weights of the entire set of tags would be nine. The tag match ratio would then be 0.56, the quotient of the two summation values (5/9=0.56). At step 365, the tag match ratio that is determined for the one or more tags associated with the selected content item is stored, and the method terminates at step 370.

The calculation performed in step 360 can be exemplified by the following equation:

$$e(T, U) = \frac{\sum_{k|t_k \in U} w(t_k)}{\sum_i w(t_i)} \quad \text{Equation 1}$$

where T is the entire set of tags associated with a given content item U, w(t) is the weight or frequency of a given tag t in the set of tags T. Therefore, the numerator of Equation 1 is the sum of the weights of tags that also appear as a keyword for the content item U and the denominator is the total weight of all of the tags in the set of tags T.

Figure 4:
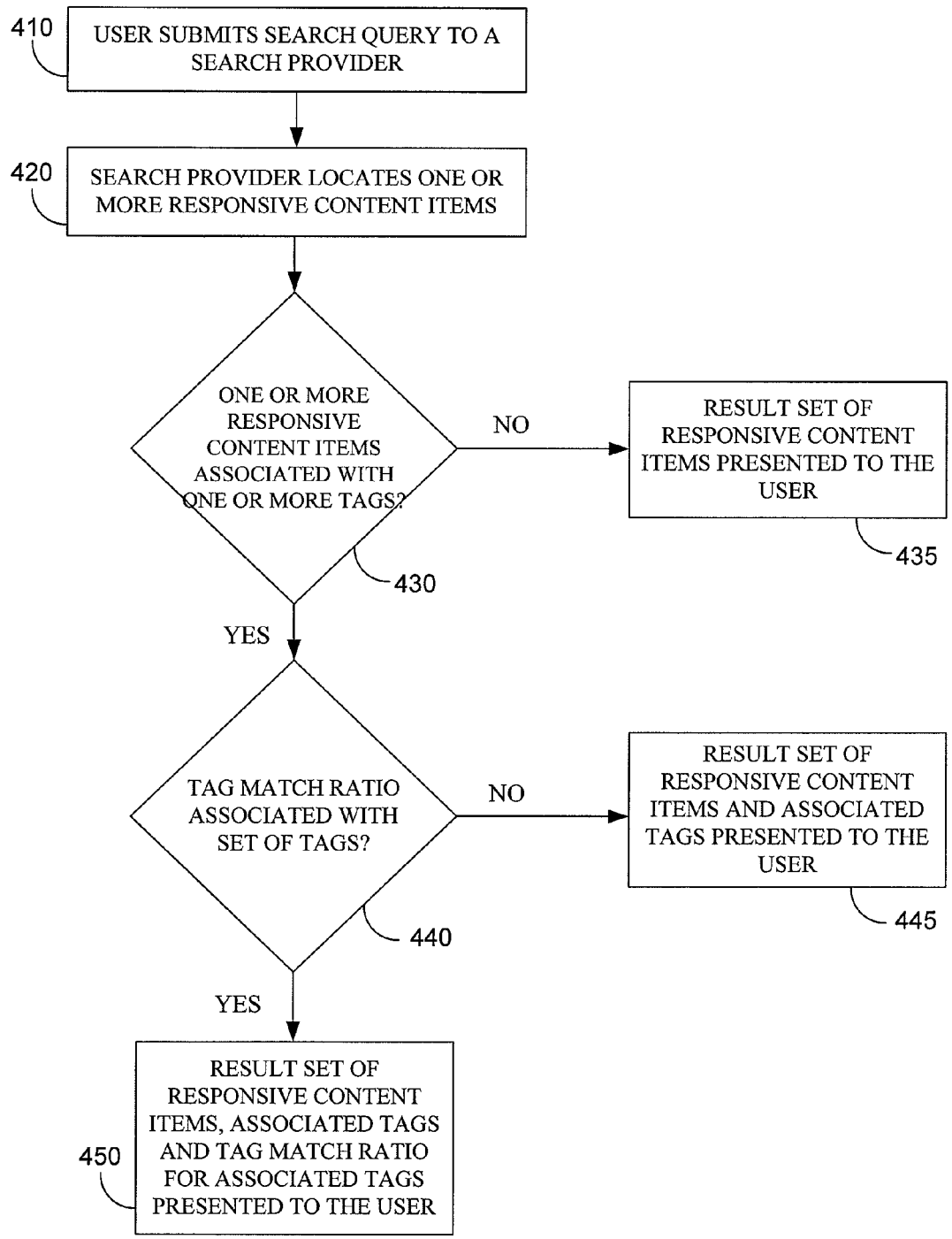
FIG. 4 provides a flow diagram illustrating a method for presenting a tag match ratio for all tags associated with a responsive content item according to one embodiment of the present invention.

FIG. 4 presents a flow diagram illustrating a method for presenting a tag match ratio for tags associated with a responsive content item. In accordance with the embodiment of FIG. 4, the method may begin by a user submitting a search query to a search provider, step 410. For example, a user may submit the search query "new york baseball team" to a search provider, such as Yahoo!®. The search provider receives the search query comprising one or more terms and locates one or more responsive content items, step 420. For example, the result set may include the New York Yankees official website, the New York Mets official website, a web page containing recent scores for both the New York Yankees and the New York Mets, a web page that contains sports scores for New York baseball teams, a web page containing an article criticizing recent play of the New York Mets, a web page that contains the schedule of New York City high school baseball teams and a web page that contains a biographical article on high school gym teacher who always wanted to play for the New York Yankees.

The search provider may make a determination as to whether the one or more responsive content items are associated with one or more tags. If none of the responsive content items are associated with any tags, e.g., users have not tagged the content items, the result set of responsive content items is presented to the user, step 435. If one or more of the responsive content items are associated with one or more tags, the method continues to step 440. Continuing from the previous example, web pages responsive to the search query "new york baseball team" may be tagged with one or more tags such as "sports," "baseball," "team," "New York," "scores"; in which case the search engine will continue to step 440.

At step 440, the search engine may then make a determination as to whether a tag match ratio is calculated for each set of tags associated with each responsive content item. If a tag match ratio was not calculated for any of the tag sets associated with the one or more responsive content items, the result set of responsive content items and associated tags are presented to the user, step 445.

If a tag match ratio is calculated for any of the tag sets associated with the one or more responsive content items, the result set of responsive content items, associated tags for the responsive content items and the tag match ratio for the associated tag set of each responsive content item are presented to the user, step 450. Continuing from the previous example, each of web pages responsive to the search query "new york baseball team" may have an associated tag set in which a tag match ratio was calculated for each associated tag set. For instance, the New York Yankees official website and the New York Mets official website may each have a tag match ratio of 1, a web page containing recent scores for both the New York Yankees and the New York Mets may have a tag match ratio of 0.8, a web page that contains sports scores for all New York baseball teams may have a tag match ratio of 0.6, a web page containing an article criticizing recent play of the New York Mets may have a tag match ratio of 0.7, and a web page that contains a biographical article on high school gym teacher who always wanted to play for the New York Yankees may have a tag match ratio of 0.2.

In these cases, the tag match ratio serves as an indicator to a user as to how accurately the tags associated with a given content item reflect the content of the content item. Accordingly, a higher tag match ratio value according to one embodiment indicates that the associated tag set more accurately reflects the content of the web document. For example, the New York Yankees official website and the New York Mets official website each having an exemplary tag match ratio of 1, indicate that the tags associated with the website accurately indicate or otherwise reflect the content of the content items, while a web page that contains a biographical article on high school gym teacher who always wanted to play for the New York Yankees having a tag match ratio of 0.2 indicates that the tags associated with the content item may not accurately reflect the content of the content item.

FIGS. 1 through 4 are conceptual illustrations allowing for an explanation of the present invention. It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; or the like.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments so fully reveals the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

What is claimed is:

1. A method for determining a tag match ratio, the method comprising:
   selecting one or more content items;
   identifying one or more tags of a plurality of tags that are associated with the one or more content items;
   determining a weight for the one or more tags associated with the one or more content items;
   extracting one or more keywords from the one or more content items;
   calculating a tag match ratio for the one or more tags of the plurality of tags associated with the one or more content items based on the frequency of the one or more tags that match the one or more keywords extracted from the one or more content items divided by the frequency of the one or more tags associated with the one or more content items; and
   storing the one or more content items, the one or more tags associated with the one or more content items, a frequency for each of the one or more tags, and the tag match ratio for the one or more tags associated with the one or more content items.

2. The method of claim 1, wherein extracting one or more keywords from the one or more content items comprises determining words comprising the one or more content items; removing stop-word; and normalizing the remaining words.

3. The method of claim 1, wherein the frequency for the one or more tags associated with the one or more content items comprises summing the weights of the one or more tags that are associated with at least two of the content items.

4. The method of claim 1, wherein extracting one or more keywords from the one or more content items comprises determining whether the one or more content items are associated with one or more keywords, wherein if the one or more content items are not associated with keywords, then selecting another content item.

5. The method of claim 1, wherein calculating a tag match ratio for the one or more tags associated with the one or more content items based on the frequency of the one or more tags that match the one or more keywords extracted from the one or more content items divided by the frequency of the one or more tags associated with the one or more content items comprises:
   identifying the one or more tags that are associated with the one or more content items that match the one or more keywords that are extracted from the one or more content items;
   summing the weights of the one or more tags that are associated with the one or more content items that match the one or more keywords that are extracted from the one or more content items;
   summing the weights of the one or more tags that are associated with the one or more content items; and
   dividing the sum of the weights of the one or more tags that are associated with the one or more content items that match the one or more keywords that are extracted from the one or more content items by the sum of the weights of the one or more tags that are associated with the one or more content items.

6. The method of claim 1, further comprising displaying together the one or more content items, the one or more tags associated with the one or more content items, and the tag match ratio for the one or more tags associated with the one or more content items.

7. A non-transitory computer readable media having computer readable program code embodied therein, the computer readable program code when executed by a processing device causes the processing device to performs method comprising:
   selecting one or more content items;
   identifying one or more tags of a plurality of tags that are associated with the one or more content items;
   determining a weight for each of the one or more tags associated with the one or more content items;
   extracting one or more keywords from the one or more content items;
   calculating a tag match ratio for the one or more tags of the plurality of tags associated with the one or more content items based on the frequency of the one or more tags that match the one or more keywords extracted from the one or more content items divided by the frequency of the one or more tags associated with the one or more content items; and
   storing the one or more content items, the one or more tags associated with the one or more content items, a frequency for each of the one or more tags, and the tag match ratio for the one or more tags associated with the one or more content items.

8. The computer readable media of claim 7, wherein extracting one or more keywords from the one or more content items comprises determining words comprising the one or more content items; removing stop-word; and normalizing the remaining words.

9. The computer readable media of claim 7, wherein the frequency for the one or more tags associated with the one or more content items comprises summing the weights of the one or more tags that are associated with at least two of the content items.

10. The computer readable media of claim 9, wherein extracting one or more keywords from the one or more content items comprises determining whether the one or more content items are associated with one or more keywords, wherein if the one or more content items are not associated with keywords, then selecting another content item.

11. The computer readable media of claim 7, wherein calculating a tag match ratio for the one or more tags associated with the one or more content items based on the frequency of the one or more tags that match the one or more keywords extracted from the one or more content items divided by the frequency of the one or more tags associated with the one or more content items comprises:
- identifying the one or more tags that are associated with the one or more content items that match the one or more keywords that are extracted from the one or more content items;
- summing the weights of the one or more tags that are associated with the one or more content items that match the one or more keywords that are extracted from the one or more content items;
- summing the weights of the one or more tags that are associated with the one or more content items; and
- dividing the sum of the weights of the one or more tags that are associated with the one or more content items that match the one or more keywords that are extracted from the one or more content items by the sum of the weights of the one or more tags that are associated with the one or more content items.

12. The computer readable media of claim 7, further comprising displaying together the one or more content items, the one or more tags associated with the one or more content items, and the tag match ratio for the one or more tags associated with the one or more content items.

13. A system comprising at least one processing device coupled to at least one client device over a network, the at least one processing device operable at least to:
- select one or more content items;
  - identify one or more tags of a plurality of tags that are associated with the one or more content items; and
  - determine a weight for of the one or more tags associated with the one or more content items;
- extract one or more keywords from the one or more content items;
- calculate a tag match ratio for the one or more tags of the plurality of tags associated with the one or more content items based on the frequency of the one or more tags that match the one or more keywords extracted from the one or more content items divided by the frequency of the one or more tags associated with the one or more content items; and
- store the one or more content items, the one or more tags associated with the one or more content items, a frequency for each of the one or more tags, and the tag match ratio for the one or more tags associated with the one or more content items.

14. The system of claim 13, wherein to extract one or more keywords from the one or more content items comprises determining words comprising the one or more content items; removing stop-word; and normalizing the remaining words.

15. The system of claim 13, wherein the frequency for the one or more tags associated with the one or more content items comprises summing the weights of the one or more tags that are associated with at least two of the content items.

16. The system of claim 15, wherein to extract one or more keywords from the one or more content items comprises to determine whether the one or more content items are associated with one or more keywords, wherein if the one or more content items are not associated with keywords, then to select another content item.

17. The system of claim 13, wherein to calculate a tag match ratio for the one or more tags associated with the one or more content items based on the frequency of the one or more tags that match the one or more keywords extracted from the one or more content items divided by the frequency of the one or more tags associated with the one or more content items comprises to:
- identify the one or more tags that are associated with the one or more content items that match the one or more keywords that are extracted from the one or more content items;
- sum the weights of the one or more tags that are associated with the one or more content items that match the one or more keywords that are extracted from the one or more content items;
- sum the weights of the one or more tags that are associated with the one or more content items; and
- divide the sum of the weights of the one or more tags that are associated with the one or more content items that match the one or more keywords that are extracted from the one or more content items by the sum of the weights of the one or more tags that are associated with the one or more content items.

18. The system of claim 13, further comprising to display together the one or more content items, the one or more tags associated with the one or more content items, and the tag match ratio for the one or more tags associated with the one or more content items.

* * * * *